US006573349B2

(12) United States Patent
Rego et al.

(10) Patent No.: US 6,573,349 B2
(45) Date of Patent: Jun. 3, 2003

(54) HIGH MOLECULAR WEIGHT MONOVINYLIDENE AROMATIC POLYMERS WITH GOOD PROCESSABILITY

(75) Inventors: Jose M. Rego, Hulst (NL); Ludo Aerts, Lokeren (BE); Duane B. Priddy, Midland, MI (US); Mehmet Demirors, Midland, MI (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 09/915,065

(22) Filed: Jul. 25, 2001

(65) Prior Publication Data

US 2002/0099236 A1 Jul. 25, 2002

Related U.S. Application Data

(60) Provisional application No. 60/222,177, filed on Aug. 1, 2000.

(51) Int. Cl.$^7$ ............................................... C08F 126/00
(52) U.S. Cl. ...................... 526/312; 526/346; 526/347; 526/308; 526/317.1; 526/319; 526/326; 526/328.5; 526/329.2; 526/329.7; 525/206; 525/284; 524/853
(58) Field of Search ............................. 526/308, 317.1, 526/319, 326, 328.5, 329.2, 329.7, 312, 346, 347; 524/853; 525/206, 284

(56) References Cited

U.S. PATENT DOCUMENTS

| 2,843,561 A | 7/1958 | Ingley et al. |
| 3,678,016 A | 7/1972 | Zimmerman et al. |
| 3,969,323 A | 7/1976 | Furrer et al. |
| 3,993,624 A | 11/1976 | Maekawa et al. |
| 4,451,615 A | 5/1984 | Charnock |
| 4,497,929 A | 2/1985 | Brown et al. |
| 5,250,391 A | 10/1993 | Miller |
| 5,268,417 A | 12/1993 | Filges et al. |
| 5,756,625 A | 5/1998 | Crandall et al. |

FOREIGN PATENT DOCUMENTS

| DE | 41 04 319 A1 | 8/1992 |
| EP | 357110 A1 | 3/1990 |
| GB | 683451 | 11/1952 |
| GB | 1101983 | 2/1968 |
| JP | 05038883 A | 2/1993 |

OTHER PUBLICATIONS

"Copolymerization of Tetrahydrofurfuryl Methacrylate with Styrene and p–Methylstyrene", S. Y. Lee, et al; pp. 229–232; Eur. Polym. J.; vol. 28, No. 3.
Thermomechanical Properties of Polymers and Copolymers of Furfuryl Methacrylate with Methyl Methacrylate and Styrene, M. Mikhailov et al, Izv. Otd. Khim. Nauki, Bulg. Akad. Nauk, (1972), 5 (1), 1–8.
Binary Copopymerizatrions of Furfuryl methacrylate with Styrene, p–methylstyrene and Acrylonitrile, S. H. Goh et al, Eur. Polym. J., (1994), 30 (4), 489–94.
Copolymerization of Furan–Containing Methacrylates with Styrene, Khr Budevska et al, Vysokomo. Soedin., Ser. B, (1967), 9 (4), 309–12.
Adducts of Furfuryl Methacrylate with some Maleimide Derivatives, Khr Budevska et al, Izv. Otd. Khim. Nauki, Bulg. Akad. Nauk, (1996), 2 (1), 111–16.
Effects of Catalyst in the Synthesis of Furfuryl Methacrylate, Graupera Canizares et al, An. Quim., (1992), 88 (3), 294–6.
Photoinitiated Copolymerization of Furfuryl Methacrylate and N,N–dimethylacrylamide, Natalia Davidenko et al, Polymer 91989), 39 (4), 917–21.
Photoinitiated Bulk Polymerization of Furfuryl Methacrylate. Experimental and Kinetic Modeling Results Obtained at Different Temperatures., Jurgen Lange et al, Polymer, (1998), 39 (12), 2537–42.
High Conversion Copolymerization of Furfuryl Methacrylate and N–vinylpyrrolidone. A Kinetic Approach to Skeist's Treatment for Free Radical Copolymerization in Different Reaction Media, Dionisio Zaldivar et al, Polymer (1994), 35 (11), 2390–6.
Activity of the Furfuryl Ring in the Free Radical Polymerization of Acrylic Monomers, Natalia Davidenko et al, J. Polym. Sci., Pat A, Polym. Chem. (1996), 34(13), 2759–66.
Monomers for Adhesive Polymers, Part 1, Synthesis and Radical Polymerizaiton of Bicyclic Monomers, Norbert Moszner et al, Polym. Bull. (Berlin), (1997), 39 (6), 669–76.

*Primary Examiner*—Tatyana Zalukaeva

(57) ABSTRACT

The present invention relates to a polymer produced by polymerizing a vinyl aromatic monomer in the presence of a small amount of furfuryl (alkyl)acrylate.

8 Claims, No Drawings

HIGH MOLECULAR WEIGHT MONOVINYLIDENE AROMATIC POLYMERS WITH GOOD PROCESSABILITY

CROSS REFERENCE STATEMENT

This application claims the benefit of U.S. Provisional Application No. 60/222,177, filed Aug. 1, 2000.

BACKGROUND OF THE INVENTION

The process of the present invention relates to monovinylidene aromatic polymers.

Many desirable properties of monovinylidene aromatic polymers are dependent upon the weight average molecular weight (Mw) of the polymer, wherein higher molecular weights provide better properties. The problem which arises with high molecular weight polymers is that of processability. Typically, high molecular weight polymers have high viscosities, making them difficult to process. Processing at higher temperatures will lower the viscosity, but in most circumstances the high temperatures needed for desirable viscosities cause polymer degradation as well.

U.S. Pat. No. 3,678,016 discloses a process wherein crosslinking addition reactions are reversible at elevated temperatures so that polymer-curing agent compositions can be maintained as fluid compositions at such elevated temperatures, long enough to be fabricated into shaped articles, and the fabricated articles are then set by cooling. However, this process requires two separate components maintained at very high temperatures (200–300° C.) and long reaction times, which still lead to polymer degradation.

Therefore, there remains a need for a polymer composition having a high molecular weight, enhanced processability and good balance of mechanical and thermal properties.

SUMMARY OF THE INVENTION

The present invention relates to a high molecular weight monovinylidene aromatic polymer produced by polymerizing a vinyl aromatic monomer in the presence of a small amount of furfuryl (alkyl)acrylate.

Surprisingly, the incorporation of a small amount of furfuryl (alkyl)acrylate allows the monovinylidene aromatic polymer to be rheologically modified such that it has high flow at elevated temperatures, yet maintains a high molecular weight and excellent mechanical and thermal properties, without polymer degradation.

DESCRIPTION OF THE PREFERRED EMBODIMENTS

Suitable vinyl aromatic monomers used to produce the monovinylidene aromatic polymer include, but are not limited to, those described in U.S. Pat. Nos. 4,666,987, 4,572,819 and 4,585,825, which are herein incorporated by reference. Preferably, the monomer is of the formula:

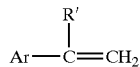

wherein R is hydrogen or methyl, Ar is an aromatic ring structure having from 1 to 3 aromatic rings with or without alkyl, halo, or haloalkyl substitution, wherein any alkyl group contains 1 to 6 carbon atoms and haloalkyl refers to a halo substituted alkyl group. Preferably, Ar is phenyl or alkylphenyl, wherein alkylphenyl refers to an alkyl substituted phenyl group, with phenyl being most preferred. Typical vinyl aromatic monomers which can be used include: styrene, alpha-methylstyrene, all isomers of vinyl toluene, especially paravinyltoluene, all isomers of ethyl styrene, propyl styrene, vinyl biphenyl, vinyl naphthalene, vinyl anthracene and the like, and mixtures thereof. The vinyl aromatic monomers may also be combined with other copolymerizable monomers. Examples of such monomers include, but are not limited to acrylic monomers such as acrylonitrile, methacrylonitrile, methacrylic acid, methyl methacrylate, acrylic acid, and methyl acrylate; maleimide, phenylmaleimide, and maleic anhydride. In addition, the polymerization of the vinyl aromatic monomer may be conducted in the presence of predissolved elastomer, such as butadiene or isoprene homopolymer or copolymer, to prepare impact modified, or grafted rubber containing products, examples of which are described in U.S. Pat. Nos. 3,123,655, 3,346,520, 3,639,522, and 4,409,369, which are incorporated by reference herein.

Polymerization processes and process conditions for the polymerization of vinyl aromatic monomers are well known in the art. Although any polymerization process can be used, typical processes are continuous bulk or solution polymerizations as described in U.S. Pat. No. 2,727,884 and U.S. Pat. No. 3,639,372, which are incorporated herein by reference.

The polymerization can be conducted at any temperature at which a high molecular weight polymer will be produced. Suitable polymerization temperatures are from about 80° C. to about 170° C., preferably from about 110° C. to about 160° C., with about 115° C. to about 150° C. being the most preferred.

An initiator may optionally be used, such as azo compounds and peroxides. Exemplary peroxides include tert-butylperoxybenzoate, tert-butylperoxyacetate, di-tert-butylperoxide, dibenzoylperoxide, dilauroylperoxide, 1,1-bis-tert-butylperoxycyclohexane, 1,1,-bis-tert-butylperoxy-3,3,5-trimethylcyclohexane and dicumylperoxide.

Additionally, molecular weight regulators can also be used in the production of the polymers of the present invention, including ethylbenzene, n-dodecyl mercaptan, polystyrene dimers and trimers, acrylate and (alkyl)acrylate dimers and trimers and the like. Other additives which may be present include plasticizers such as mineral oil, polybutene and the like, and antioxidants such as hindered phenols.

The furfuryl (alkyl)acrylates useful in producing the high molecular weight monovinylidene aromatic polymers include furfuryl acrylates, furfuryl methacrylates, furfuryl ethacrylates and the like. Alkyl substituted furfuryl (alkyl) acrylates can also be used, wherein the furfuryl group is additionally substituted with a $C_1-C_{10}$ alkyl group such as methyl, ethyl, butyl, isobutyl, propyl, isopropyl, pentyl and the like, e.g. 2-(5-methylfurfuryl)methacrylate. Preferably, furfuryl methacrylate is used.

The amount of furfuryl (alkyl)acrylate used in the polymerization is an amount such that the resulting monovinylidene aromatic polymer is rheologically modified to give high flow at elevated temperatures, such as 180 to 280° C., yet maintain a high Mw and good mechanical and thermal properties. Preferably from 0.1, more preferably from 0.3, most preferably from 0.5 to less than 3, preferably less than 2.9, more preferably less than 2.8 and most preferably less than 2.7 weight percent furfuryl (alkyl)acrylate is present, based on the total weight of the vinyl aromatic monomer and furfuryl (alkyl)acrylate. It has been surprisingly discovered that such monovinylidene aromatic polymers have enhanced flow and rheological properties, yet maintain high molecular weights and excellent physical properties.

Copolymers of furfuryl methacrylate and styrene have been disclosed in various references including European Polymer Journal, vol. 30, No. 4, pp. 489–494. However, the amounts of furfuryl methacrylate used, causes increased amounts of crosslinking and decreased processability. Unexpectedly, the applicants have found that small amounts as claimed herein, offer increased molecular weight with good flow and processability and excellent physical properties.

The molecular weight of the resulting polymer is dependent upon a number of factors including the temperature, the (optional) initiator concentration, and the time of reaction. The term molecular weight (Mw) refers to the weight average molecular weight as determined by gel permeation chromatography calibrated with narrow polystyrene standards and using a refractive index detector.

The molecular weight of the high molecular weight polymer formed is typically from 100,000 to 500,000, most preferably from about 120,000 to about 450,000, as measured by gel permeation chromatography. Polymers having molecular weights greater than 450,000 are undesirable because they are difficult to process. Polymers having molecular weights less than 100,000 will not have the desirable properties obtained by the present invention.

The high Mw monovinylidene aromatic polymer produced by the process of the present invention can be employed in applications where high molecular weight vinyl aromatic polymers are suitably used, such as foam sheet, films and injection molding processes. They can also be combined with polymers of differing Mw to make polymer compositions having a multimodal molecular weight distribution, preferably a bimodal molecular weight distribution, hereinafter referred to as bimodal compositions.

In one embodiment, the high molecular weight monovinylidene aromatic polymer is produced by polymerizing a composition consisting essentially of a vinyl aromatic monomer ath a small amount of furfuryl (alkyl)acrylate. The phrase 'consisting essentially of' refers to the components which are essential in order to obtain the advantages of the present invention and any other components present would not significantly change the properties related to the inventive advantage.

The following examples are provided to illustrate the present invention. The examples are not intended to limit the scope of the present invention and they should not be so interpreted. Amounts are in weight parts or weight percentages unless otherwise indicated.

EXAMPLES 1–4

Polystyrene

Styrene is polymerized in the presence of 2-propenoic acid, 2-methyl, 2-furanylmethyl ester (also known as Furfuryl methacrylate (FMA)) at ratios shown in TABLE 1. The polymerizations are conducted in test tubes using an initiator (1,1-di(tert-butylperoxy)cyclohexane (BPC)) and two molecular weight moderators (ethylbenzene (EB) and n-dodecyl mercaptane (nDM)).

The temperature profile is: 35 minutes at 115° C. and 45 minutes at each of the following temperatures: 125, 130, 140, 150, 160, 170, 180 and 185° C.

Prior to the polymerization, the samples are degassed, then polymerized to a conversion of 88 percent and dried in a vacuum oven at 30° C. for 48 hours. Note that the Example codes refer to the amount of polymerized FMA and styrene (S) in the dried polymers as determined by NMR. The molecular weights are measured by gel permeation chromatography and are given in TABLE 2. General Purpose polystyrene (GPPS) resin is also included as a control in order to show the optimized rheology.

The samples obtained are analyzed by molten state dynamic mechanical spectroscopy (DMS) at 200° C. in the frequency range from 0.1 rad/s to 100 rad/s, using 25 mm diameter parallel plates. The dynamic strain frequency sweep mode is used at a strain of 10%.

TABLE 1

| Example | Styrene wt. % | FMA[1] wt. % | BPC[2]/ ppm | n-DM[3]/ ppm | EB[4] wt. % |
|---|---|---|---|---|---|
| S (100)/FMA (0)* | 92 | 0 | 250 | 350 | 8 |
| 1. S (98.7)/FMA (1.3) | 91.1 | 1 | 250 | 350 | 7.9 |
| 2. S (97.5)/FMA (2.5) | 90.2 | 2 | 250 | 350 | 7.8 |
| 3*. S (96.3)/FMA (3.7) | 89.2 | 3 | 250 | 350 | 7.8 |
| 4*. S (95)/FMA (5) | 88.2 | 4 | 250 | 350 | 7.8 |

[1]furfuryl methacrylate (FMA)
[2]1,1-di(tert-butylperoxy) cyclohexane (BPC)
[3]ethylbenzene (EB)
[4]n-dodecyl mercaptan (nDM)
*Comparative Examples

TABLE 2

| Example | Mw | Mn | Mz |
|---|---|---|---|
| Commercial GPPS resin-Control* | 265,000 | 115,000 | 450,000 |
| S (100)/FMA (0)* | 192,000 | 71,000 | 350,000 |
| 1. S (98.7)/FMA (1.3) | 257,000 | 81,000 | 507,000 |
| 2. S (97.5)/FMA (2.5) | 330,000 | 88,600 | 677,000 |
| 3.* S (96.3)/FMA (3.7) | Sample did not dissolve completely in THF | | |
| 4.* S (95)/FMA (5) | Sample did not dissolve completely in THF | | |

Mw stands for weight average molecular weight, Mn for the number average and Mz for the z average
*Comparative Examples

TABLE 3

Complex viscosity (Pa · s) as a function of shear rate associated with the resins given in Table 2.

| Example | Zero shear rate | 100 rad/s shear rate |
|---|---|---|
| Commercial GPPS resin-Control* | 16100 | 900 |
| S (100)/FMA (0)* | 6600 | 649 |
| 1. S (98.7)/FMA (1.3) | 10000 | 630 |
| 2. S (97.5)/FMA (2.5) | 26900 | 630 |
| 3.* S (96.3)/FMA (3.7)* | 81000 | 700 |
| 4.* S (95)/FMA (5)* | Unable to measure | |

*Comparative Examples

TABLE 3 shows results for the complex viscosity as a function of shear rates. It is apparent from this Table that:

All samples containing FMA have higher Mw's than the straight GPPS resin produced under the same conditions.

Example 2 has a higher viscosity than the commercial GPPS material at low shear rates and a lower viscosity at higher shear rates. The higher zero shear rate viscosity is expected from the molecular weight features associated with this resin, specifically with Mw; however, the lower viscosity values observed at higher shear rates gives an indication of the improved Theological behaviour associated with these polymers: increased mechanical strength (from zero shear rate viscosity values) in combination with higher flow at higher shear rates.

EXAMPLE 5

High Impact Polystyrene

Compositions as shown in TABLE 4 are polymerized using a batch reactor. Two temperature ramps are used: from 95 to 120° C. in 45 minutes and from 120 to 140° C. in 120 minutes. The agitator speed is 100 rpm in both cases. The conversion obtained for both samples of HIPS (the control and Example 5) is 38%. The samples are dried under vacuum at 30° C. for 90 minutes and at 200° C. for 10 minutes. The final composition of the HIPS samples is given in TABLE 5. The properties associated with each HIPS sample are given in TABLE 6.

TABLE 4

|  | Control HIPS* | Example 5 |
| --- | --- | --- |
| Styrene/wt. % | 83 | 82.5 |
| Ethylbenzene/wt. % | 10 | 10 |
| Rubber (Diene 55AC15)/wt. % | 7 | 7 |
| NDM/ppm | 1000 | 1000 |
| FMA/wt. % | 0 | 0.5 |

*Comparative Example
Diene 55 is available from Firestone.

TABLE 5

|  | Control HIPS* | Example 5 |
| --- | --- | --- |
| Rubber (Diene 55AC15)/wt. % | 18.4 | 18.4 |
| FMA/% | 0 | 1.3 |

*Comparative Example

TABLE 6

|  | Control HIPS* | Example 5 |
| --- | --- | --- |
| Rubber Particle Size Size/μm | 5.8 | 6.1 |
| Mw | 124000 | 159000 |
| Mn | 51000 | 57000 |
| MFR / g/10 min (Cond G) ASTM D1238-94 | 7.2 | 6 |
| Izod Impact / J/m ASTM D256-93A | 91 | 102 |
| Tensile Yield / MPa ASTM D638M-93 | 18.6 | 20.2 |
| Tensile Modulus / N mm-ASTM D638-93 | 1700 | 1850 |

*Comparative Example

Note the decreased MFR and increased izod and tensile properties of the present invention over the Control HIPS.

What is claimed is:

1. A high molecular weight polymer produced by polymerizing a composition comprising a vinyl aromatic monomer and from 0.1 to less than 3 weight percent furfuryl (alkyl)acrylate, based on the total weight of the vinyl aromatic monomer and furfuryl (alkyl)acrylate.

2. The polymer of claim 1, wherein the vinyl aromatic monomer is styrene.

3. The polymer of claim 1, wherein the furfuryl (alkyl) acrylate is furfuryl methacrylate.

4. The polymer of claim 1, having a Mw of from 100,000 to 500,000.

5. A process of producing a high molecular weight monovinylidene aromatic polymer comprising polymerizing a vinyl aromatic monomer in the presence of from 0.1 to less than 3 weight percent furfuryl (alkyl)acrylate, based on the total weight of the vinyl aromatic monomer and the furfuryl (alkyl)acrylate.

6. The process of claim 5, wherein the vinyl aromatic monomer is styrene.

7. The process of claim 5, wherein the furfuryl (alkyl) acrylate is furfuryl methacrylate.

8. An article produced by the polymer of claim 1.

* * * * *